Figures 1, 2:
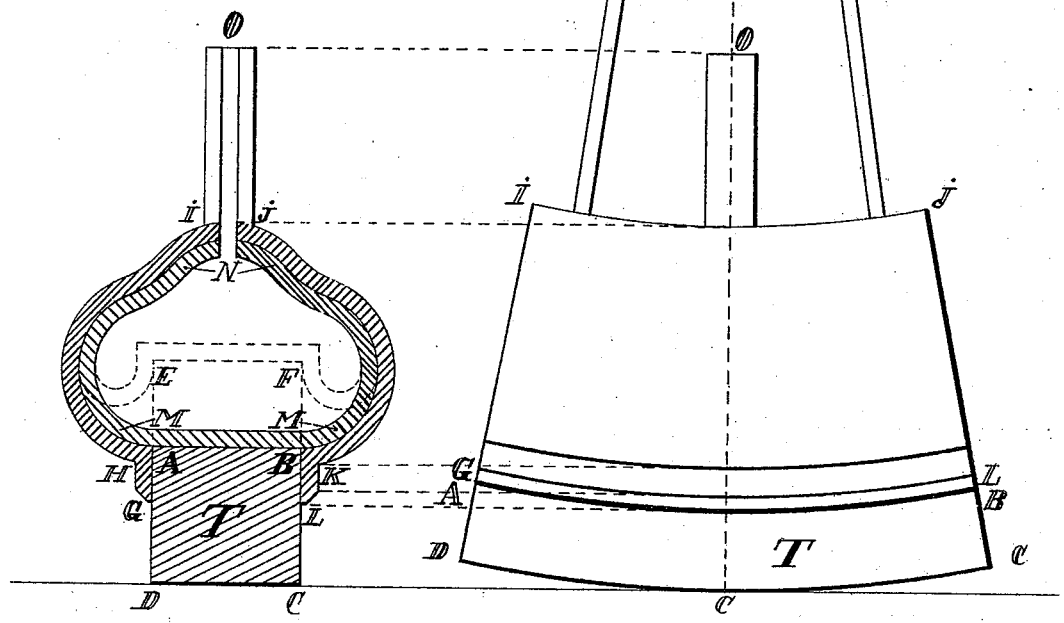

(No Model.)

O. L. WULLWEBER.
BICYCLE TIRE.

No. 501,239. Patented July 11, 1893.

Witnesses
John C. Wright.
Oscar H. Petersen.

Inventor
O. L. Wullweber

UNITED STATES PATENT OFFICE.

OTTO L. WULLWEBER, OF CHICAGO, ILLINOIS.

BICYCLE-TIRE.

SPECIFICATION forming part of Letters Patent No. 501,239, dated July 11, 1893.

Application filed September 15, 1891. Serial No. 405,816. (No model.)

*To all whom it may concern:*

Be it known that I, OTTO L. WULLWEBER, a citizen of the United States, residing at Chicago, in the county of Cook and State of Illinois, have invented certain new and useful Improvements in Bicycles, pertaining specifically to Bicycle Wheels and Tires, of which the following is a specification.

In my invention the form of the metal rim of the bicycle wheel, which holds the round rubber tire as now in general use, is entirely changed in shape and I employ an entirely different shaped tire also and the latter in connection with a flexible air tube to act as an elastic cushion for my tire.

The objects of my improvements are:—first, to provide a wheel, which will have the same elasticity at its periphery, if not a greater one, than the best pneumatic tire wheels have, which are now in use; second, to provide a wheel, which, while having the greatest possible elasticity at its periphery, will not be subject to be rendered useless until repaired, by having the pneumatic tire punctured or damaged by accident while in use; third, to provide a wheel, which will not require fastening or cementing the tire to its metal rim; and, fourth, to provide a wheel from the rim of which the tire can be removed and replaced in a few minutes, thus rendering the repairing of wheels, when the tires are worn out by long use, an extremely simple and easy matter. I attain these objects by the mechanism illustrated in the accompanying drawings, in which—

Figure 1 is a side view of a section of the rim and tire of a bicycle wheel and Fig. 2 a vertical section of the rim, tire and flexible air cushion for said tire of a bicycle wheel.

Similar letters refer to similar parts throughout both views.

In Fig. 1 T represents a segment of a flexible tire while G, I, J, L represent a section of the metal rim of a bicycle wheel. S—S represent spokes, while P represents a portion of the hub of a bicycle wheel. O represents a flexible tube for inflating a flexible hollow tubular air cushion contained within said iron rim G I J L, not visible in Fig. 1.

In Fig. 2 the rim G. H. I. J. K. L. is the metal rim, which protects the flexible tubular air cushion N M M, which is inside of it, from injury, while in practical use, excepting at the lower or peripheral opening of said rim from A to B. This metal rim has at its periphery said opening A B, which extends vertically to its outer periphery to G and L, thus forming the two flanges or vertical planes A G and B L, between which two flanges or vertical planes is placed the flexible tire T. This flexible tire T has two vertical sides A D and B C, parallel to each other, while the upper [A—B] and the lower [D—C] sides of said tire T may be of any desirable shape, while the upper edges at A and B should be chamfered, beveled or rounded off a trifle so as to produce less wear on the flexible tubular air cushion N M M at M M. The outer periphery D—C of the flexible tire T is considerably larger than the outer periphery G L of the metal rim G H I J K L, sufficient for the the practical working of the mechanism as hereinafter set forth.

O represents a flexible tube, connected with the air cushion N M M at N, to admit of air being pumped into said air cushion at N, where a suitable valve is to be attached to prevent the escape of air.

The line D—C, Fig. 2 represents the point or line of contact of the tire T with the surface the wheel may be running on, while the bicycle is in motion. It should also be stated, that the metal rim G H I J K L should be made of sufficient width and height to prevent injury to the inflated flexible tubular air cushion N M M, when the tire T is forced suddenly into the same by obstructions, so as not to create curvatures in the same of too small a size, which might injure said air cushion in course of time.

It will be readily seen, that my first object, that of producing a wheel with the greatest possible elasticity, is attained by the flexible tire T in connection with the inflated flexible tubular air cushion N M M; for the flexible tire T, running on an irregular surface or striking obstructions in the shape of small stones, pebbles, &c., will instantly be pressed upward by these obstructions or elevations, against and into said air cushion N M M, which will prevent any and all jars, unless the obstruction or elevation on the surface is higher than the projection of the flexible tire T from the outer periphery of the iron rim G H I J K L, which projection is illustrated in Fig. 2 by the lines D G and C L. It is evident, that, when the tire T is pressed upward by any obstruction on the ground, it will, if said obstruction is of sufficient size, guided by the flanges at A G and B L, be pressed upward into the inflated flexible tubular air cushion to a height, so that points D and C of the tire T will reach points G and L respectively of the flanges of the metal rim, while the upper points A and B will press upward into said air cushion N M M, until they reach points E and F, as indicated by the dotted lines in Fig. 2. It is also evident, that the moment the obstruction or elevation has been passed over, the force of the compressed air in the inflated air cushion N M M will instantly repel the flexible tire T out again into its natural position at A—B.

My second object, that of rendering the puncturing or injuring of the inflated flexible tubular air cushion N M M almost impossible, I attain, as is very evident from the drawing Fig. 2, by incasing said air cushion almost completely with the metal rim, excepting only as stated at the peripheral opening in said rim from A to B, which being completely filled from flange A G to flange B L with the large and compact but flexible tire T, will effectually prevent any sharp or pointed objects from reaching and injuring said inflated flexible air cushion N M M.

I attain my third object, that of doing away with the fastening or cementing of tires to the metal rims of bicycle wheels, by the peculiarity of my construction Fig. 2; for by the vertical shape of the flanges at A G and B L of the metal rim, between which the vertical sides A D and B C of the tire T move upward and downward in close contact with said flanges at A G and B L, when striking obstructions or elevations on one side of the tire, it will render the side rolling or twisting of the tire T impossible or while riding about horizontally on an inclined plane, excepting only a slight elevation caused by the flexible nature of the tire T at the points of contact D or C, whichever may be traveling on the higher side of said inclined plane.

My fourth object, that of removing and replacing of the flexible tubular air cushion and of the flexible tire T in a few minutes, I attain as clearly proven and evident from the construction of the metal rim G H I J K L, Fig. 2; for as both, the flexible, tubular air cushion as well as the flexible tire T are manufactured from material, which admits of their being stretched considerably, it is evident, that, after inserting the air tube O, which is attached to the flexible tubular air cushion N M M, into an opening prepared at I J in the metal rim of the bicycle wheel, the balance of said flexible tubular air cushion N M M can, by stretching it sufficiently, be easily placed into the metal rim G H I J K L through its aperture at its extreme periphery G L. The flexible tire T is, in a similar manner, by stretching it, placed in its proper position through the aperture in the metal rim at G L, forming the line of contact with the inflated flexible tubular air cushion at A B.

I am aware, that, prior to my invention, inflated flexible air tubes have been used on bicycle wheels as direct tires to roll on the surface, covered only with an insufficient protection against damage. I do not therefore claim the inflated flexible air tube which is used as a tire, as my invention; neither do I broadly claim as my invention a tire for cycles and other wheels having a single inflated tube situated wholly within the felly of the wheel and a tread portion seated upon said inflated tube, and extending partly within and partly beyond the edges of the felly, but What I do claim as my invention, and desire to secure by Letters Patent, is—

1. The flexible tire T, having the two vertical sides A D and B C parallel to each other, in combination with a tubular wheel-rim or felly having its periphery longitudinally slotted, the sides of the slot being upset to form parallel flanges adapted to frictionally embrace the vertical sides of the tire, substantially as described.

2. In a bicycle wheel, the combination with a flexible tire of an annular air cushion for supporting the tire, and a rigid tubular felly for inclosing the cushion, the felly chamber being wider than the cushion, substantially as described.

3. In a bicycle wheel, the combination with a flexible tire having its vertical sides parallel, and with rigid flanges having frictional contact with said tire sides, of an annular air cushion for supporting the tire substantially as described.

4. In a bicycle wheel, the combination with an elastic tire having its vertical sides flat and parallel, of an annular air cushion immediately within and for the purpose of supporting the tire, and a tubular felly for inclosing the air cushion and being of greater internal width than said cushion and having its periphery longitudinally channeled to receive the tire, and parallel radial flanges upon each side of said channel adapted to frictionally embrace the tire, substantially as described.

OTTO L. WULLWEBER.

Witnesses:
SAML. L. MCNAUGHTON,
JOHN C. WRIGHT,
H. P. HOLDEN,
M. WULLWEBER.